127,411

UNITED STATES PATENT OFFICE.

JOHN L. GRAVES, OF SPRINGFIELD, MASSACHUSETTS.

IMPROVEMENT IN MAKING ILLUMINATING-GAS.

Specification forming part of Letters Patent No. 127,411, dated June 4, 1872.

*To all whom it may concern:*

Be it known that I, JOHN L. GRAVES, of Springfield, in the county of Hampden and State of Massachusetts, have invented a new and useful Improvement in the Art of Making Illuminating-Gas; and that the following is a full, clear, and exact description thereof.

The compound which is produced by my process or improvement in the art of making gas is a mixture of ordinary street gas and gasoline gas. These elements may be mixed in various proportions, and I do not limit myself to a process which produces any special proportion of each element in the resulting compound or mixture.

By street gas I mean gas produced by the destructive distillation of coal, oil, resin, bitumen, wood, &c., in manner now well known and in common use; and by gasoline gas I mean common air, holding and carrying in suspension the vapor of gasoline or other heavier hydrocarbons resulting from the distillation of coal, shales, bitumen, mineral oils, &c.

The first step of my process, and I call it one step, although it really involves several operations, is to produce washed and purified street gas in any of the known ways in use. The second step is to produce gasoline gas by forcing a current of air beneath a column of hydrocarbon contained in a close vessel; and by close vessel I mean a vessel so constructed that it shall not permit the air to escape to waste after passing through the hydrocarbon. The third step is to wash the gas thus formed by passing it through a column of water, or other fluid which is an equivalent thereof, for the purpose of washing this gas; and the last step of the process is to mix the washed gasoline gas with the street gas. No special apparatus is needed in carrying out the process.

I prefer to use, and have used with success in actual practice, in lighting a large town, a vessel containing a column of gasoline from two to two-and-a-half feet in height, and not entirely filling the vessel, and have forced, by means of an air-pump or bellows, from four hundred to twelve hundred cubic feet of air per hour, (the larger quantities of air being used in warm weather, and when light oils or oils of light specific gravity are contained in the tanks,) through a two-inch pipe into the bottom of this vessel, the air being emitted through a multitude of small holes pierced in a strainer or rose-nozzle, or in a coiled pipe lying on the bottom of the vessel. This gasoline or hydrocarbon was of different specific gravities; but I generally use hydrocarbons of from 62° to 92° Baumé, at 60° Fahrenheit, and found that the best and most uniform results were produced where the hydrocarbon was kept at a temperature a little below its boiling-point—say from 60° to 300° Fahrenheit—the required heat increasing, as the hydrocarbons are more dense, about ten degrees of heat for every degree of Baumé's hydrometer. This heat may be maintained by steam-pipes or a steam-jacket, or by heating the air in any known convenient manner; preferring, if the air be heated, to heat it on its way from the pump to the tank or vessel of gasoline or other hydrocarbon. In practice I usually force the largest quantity of air per hour through the column at the commencement of the operation, or after the tank has been filled afresh, and decrease the quantity of air as the hydrocarbon becomes denser. I also draw off samples of the hydrocarbon from time to time, and usually increase the heat of the air or of the column of hydrocarbon as its density increases, the density being determined by a hydrometer applied in the samples.

After the air has found its way up through the column of gasoline it carries gasoline vapor suspended in it, and occupies the upper part of the vessel or tank, and is permitted to flow, still under pressure, through proper pipes or passages, and, by preference, through a strainer or rose-nozzle, into the lower part of a vessel containing water, the column of water being usually some four or five feet high; the air, mingled with vapor of gasoline, in passing through this water, which I prefer to keep at a temperature of about 45° Fahrenheit, parts with such portions of the gasoline as it cannot hold permanently suspended under the ordinary conditions of the use of street gas. The water in the tank may be changed from time to time, and the condensed vapors are to be drawn off from time to time as they accumulate. This step of the process I have called washing; but it is not properly a washing process, as the water does not dissolve or hold in solution any portion of the condensed hydrocarbon vapor. This step of the process is more properly a refrigerating or condensing process, and the water, as far as I can discover, acts only as a medium by which the cold is brought in contact with each bubble of air, so that each and every particle of the air is cooled alike. With a view of testing this theory I have used in the washing-tank a column of hydrocarbon—the crude naphtha of commerce—kept at a temperature below 45°, sometimes as low as 32½° Fahrenheit. I have also used the hydrocarbon remaining in the impregnating-tank, or tank through which the atmospheric air was passed, in order to charge it with vapor; this residuum being that from a hydrocarbon of about 85° Baumé, at 60° Fahrenheit in density, and being left where no artificial heat was applied either to the impregnating-tank or the air entering it. The crude naphtha of commerce is really not crude, but a product of distillation of a density of about 70°, and containing various oils, varying in density from 62° to 90° Baumé, or thereabout, at 60° Fahrenheit.

When these oils were used in place of a column of water they produced the same effects as water in so far that they deprived the air which had passed the first tank of such quantities of vapor as it could not carry under the ordinary conditions of the use of street gas. I therefore consider them as equivalents of water for the purpose of washing the gasoline gas, and believe that vegetable and animal oils would serve the same purpose and be the equivalents of water for the purpose of washing the air, thus carrying vapor of hydrocarbon suspended in it. Other liquids would answer the same purpose provided they or some of their constituents did not combine chemically with the vapor.

By forcing air by measure through a column of gasoline at a given height and then washing the air, thus carrying vapor in suspension by passing it through a column of a certain height and temperature, I am enabled to produce a gasoline gas of remarkably uniform character; and I prefer always to charge the air too highly with vapor prior to washing, and so to proportion the supply of air, height of column of gasoline, and temperature thereof, as also the height of water or other fluid column and the temperature thereof, that I produce a gasoline gas in which the proportion of vapor is to the air in the ratio of about four-tenths to one by weight. These proportions may be varied by varying any or all of the conditions above stated, and I intend to vary them; but the nature of the process is such that a gasoline gas of nearly or actually uniform density and lighting power can be attained by the use thereof; and a reasonable degree of uniformity of quality of this gasoline gas is essential in order to produce a useful mixture or compound of gasoline gas and common street gas. The latter is easily obtained by known processes, of tolerably uniform composition and lighting-power; but if the gasoline gas be too rich, the mixture will smoke or condense in the pipes, or be faulty in both respects. If it be too poor, the candle-power of the mixture will be lessened. It is essential that gas shall not smoke, and it is, to say the least, inconvenient to use gas whose light-giving power constantly varies. No gas company could satisfy its consumers if the gas varied constantly in lighting-power. In actual practice I have usually kept a test-light constantly burning and supplied with gasoline gas from the upper part of the vessel in which it is washed; and by observations upon this light am enabled to determine as to the uniformity in quality of the gasoline gas, and am warned to take measures for altering its quality in case of necessity.

The street gas may be made first and the gasoline gas last, or the manufacture of both may proceed at the same time; and I mix the two in any required or desirable proportions by filling a gasometer partially with the one and partially with the other at different times, or by permitting them both to flow into the same gasometer at the same time, the quantity or volume of each being regulated by stop-cocks and measured by meters; or I fill two gasometers, each with one of the gases, and mix them as they flow into the mains or service-pipes; but I prefer to mix the gases by admitting them into the same gasometer. I have used this mixed gas successfully in lighting a large town for several months, and I prefer to mix one volume of gasoline gas at a density of one and four-tenths with from one to four volumes of street gas, but have mixed and burned it successfully and profitably in very different proportions.

The mixed gas has always a greater lighting-power per cubic foot than ordinary street gas, and is less expensive. Smaller mains, smaller gas-works, and a less capacity of gasometers may therefore be employed for furnishing an equal quantity of light; and I find that the mixture is less liable than ordinary street gas to form deposits in the pipes.

Now, I wish to be understood that I am aware of the fact that street gas has been passed through or over gasoline in order, as it is termed, to carburet it; also, that it has been proposed in England to make what is called by the inventor a triple compound of air, street gas, and vapor of gasoline, &c., the vapor being obtained by passing air over the surface of shallow trays containing gasoline, and this unwashed vapor being then mixed with air and street gas. This plan has, as far as I can ascertain, never been successfully practiced, probably for the reason that a mixture of uniform lighting-power could not be produced. I also wish it to be understood that the proportions in which I mix are various; that I use hydrocarbons of different specific gravities, at various temperatures, and of various heights of column. So, also, I use various volumes of air, various heights of columns of water or other fluid in the washing stage of the process, and various temperatures thereof; but I always force the air through a column of the hydrocarbon in order that it may be impregnated with the vapor thereof, and always wash the air thus charged with the vapor of a hydrocarbon by passing it through a column of water or other fluid which is an equivalent therefor, as before defined. I have sometimes, in practice, used lime-water (known by that term to druggists) or water mixed with lime, instead of water alone, when the hydrocarbons contained sulphur or carbonic acid; and I intend to use lime or other absorbents of impurities in connection with water; but water or its equivalent must always be present in the vessel through which the gasoline gas is passed after it is formed and before it is mixed with the street gas.

I have stated that no special apparatus is necessary for the proper working of my process, and do not think it necessary to describe one, as any competent gas engineer or chemist conversant with gas-making can, after reading this description, without further instruction and without invention, plan such apparatus.

I claim as of my own invention—

The herein-described process, by means of which a mixture of gasoline gas and common street gas is produced.

JOHN L. GRAVES.

Witnesses:
N. A. LEONARD,
GEO. M. DIMMOCK.